Dec. 5, 1933.         C. H. WOLFF              1,938,364
                      DIAGNOSTIC DEVICE
             Filed Nov. 19, 1931        2 Sheets-Sheet 2
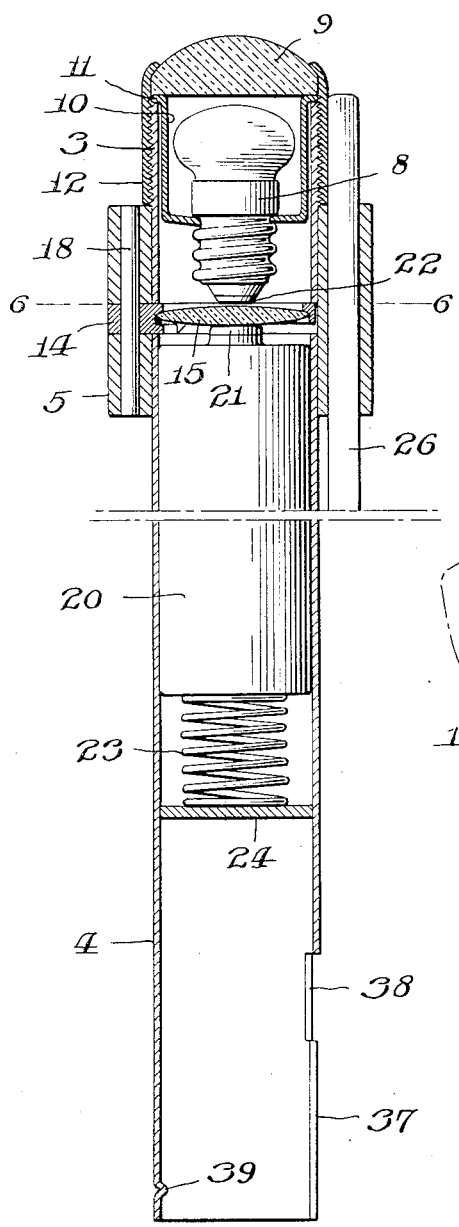
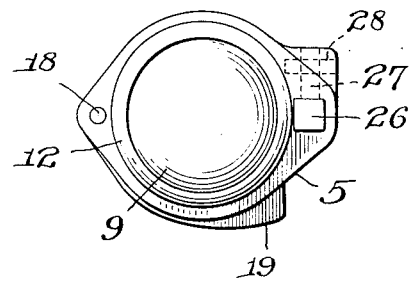
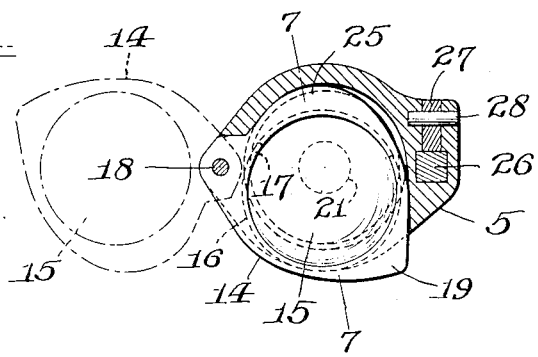
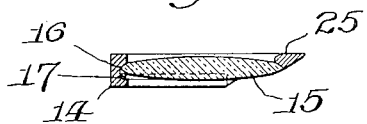
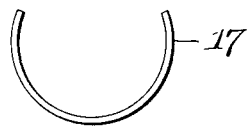
Inventor:
Charles H. Wolff Patented Dec. 5, 1933

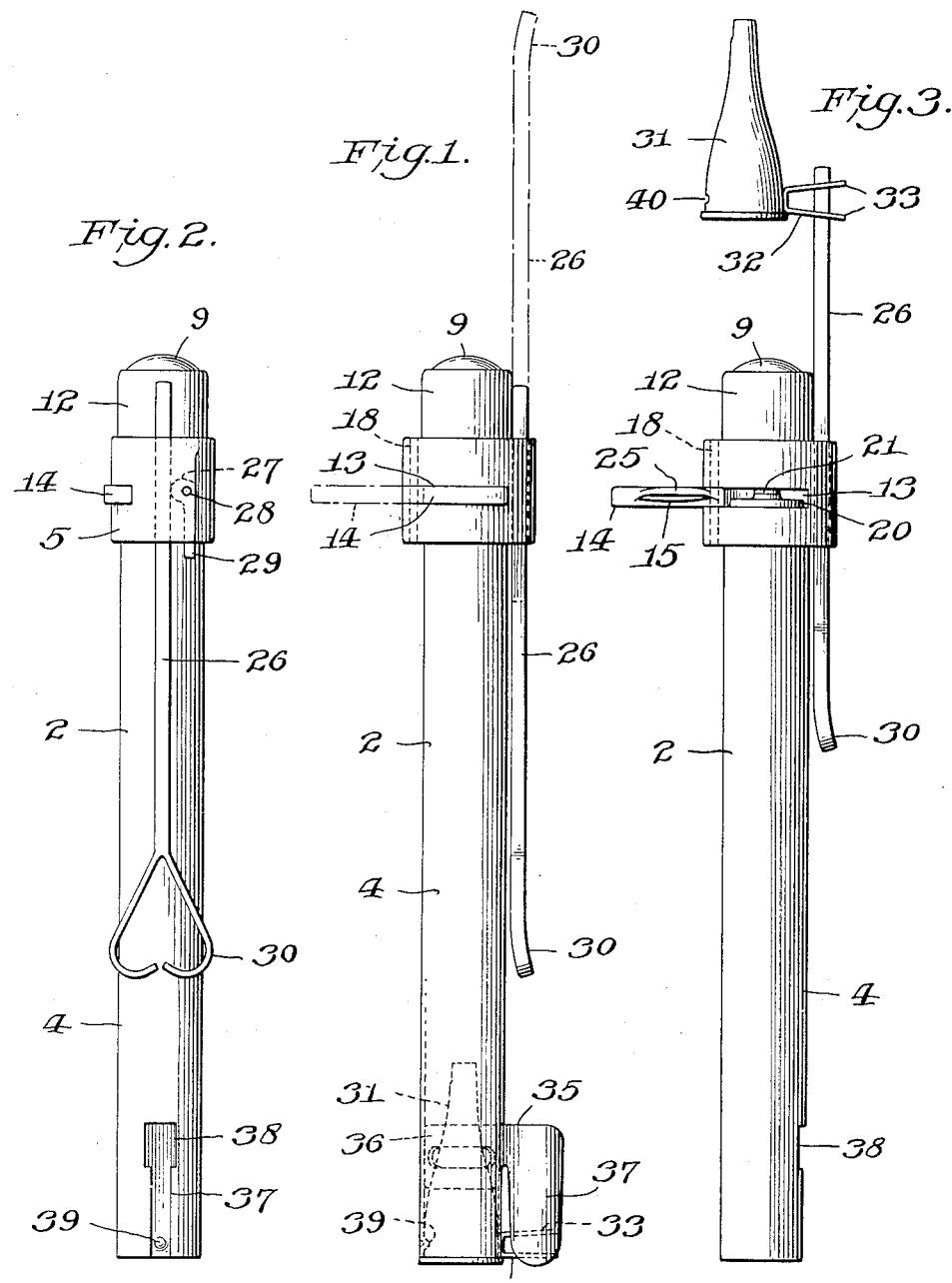

1,938,364

UNITED STATES PATENT OFFICE 1,938,364

DIAGNOSTIC DEVICE

Charles H. Wolff, Philadelphia, Pa.

Application November 19, 1931
Serial No. 576,084

6 Claims. (Cl. 128—23)

This invention relates to improvements in diagnostic devices wherein are employed a casing, an electric lamp for supplying light to the parts of the patient to be examined, a battery cell for supplying current to the lamp, a magnifying lens through which the parts to be examined may be viewed and one or more diagnostic instruments associated with the casing to engage and displace parts adjacent to the parts being examined so that the parts being examined may be clearly viewed.

An object of the invention is to provide a simple, inexpensive and efficient device of this character of sturdy and compact construction and of such slender proportions as to enable a physician to carry the same with ease and comfort in a vest pocket or in any other suitable place.

Another object is to provide a lens holder and a magnifying lens therefor which are movable from a protecting position within the casing to a viewing position exteriorly thereof and back again, and which when moved out from the casing to the viewing position will automatically connect the battery cell and the lamp for supplying current to the latter, and which when moved back into the casing will cut off the supply of current to the lamp.

Another object is to utilize the glass magnifying lens as an electrical insulating means between the electric lamp and the battery cell when the lens and its holder are in the protecting position within the casing.

Another object is to provide a novel and advantageous means whereby any one of several diagnostic instruments may be supported by the casing of the device in different positions of adjustment relatively to the lamp and the viewing lens.

Another object is to so construct and relate the several parts of the device that many advantageous results accrue therefrom.

With the foregoing and related objects in view the invention consists in the novel construction, combination and arrangement of parts hereinafter described and claimed.

In the accompanying drawings, illustrating the invention,

Figure 1 is a side view of my improved diagnostic device, showing by dot-and-dash lines, certain parts thereof moved from their normal positions to outwardly extending or operative positions.

Figure 2 is a view of the device as seen from the right hand side of Fig. 1, with the ear and nasal speculums removed from the lower end of the casing.

Figure 3 is a view similar to Fig. 1, showing the lens holder moved out from its protecting position within the casing to its operative or viewing position and showing the ear and nasal speculums removed from the lower end of the casing and the ear speculum mounted on the adjustable bar which supports the diagnostic instruments.

Figure 4 is an enlarged longitudinal section through the device omitting the speculums from the lower end portion of the casing.

Figure 5 is a top view of the device.

Figure 6 is a transverse section through the device, on line 6—6 of Fig. 4, showing, by dot-and-dash lines, the lens holder moved to its outer or operative position.

Figure 7 is a section through the lens holder and lens, on line 7—7 of Fig. 6.

Figure 8 is a view of the spring for retaining the viewing lens in place within its holder.

Figure 9 is an end view of the nasal speculum.

Figure 10 is a side view of the nasal speculum.

Referring to the drawings, 2 designates the casing of the device, which is of tubular form and comprises upper and lower members 3 and 4, respectively, and an intermediate member 5 forming an expanded portion for the casing.

The member 5 is shaped as clearly shown in the drawings and it is preferably formed as a die casting. The upper and lower members 3 and 4 may be formed of ordinary stock metal tubing, and they are secured within and project from the member 5.

Arranged within the upper member 3 of the casing is an electric lamp 8 and the casing carries a lens 9 at the upper end thereof for directing rays of light from the lamp 8 outwardly from the end of the casing. The lamp 8 is screwed into and through the bottom wall of a metal cup 10 within the casing member 3. The upper end of the cup 10 is provided with an outwardly-extending annular flange 11 which engages the upper or outer end of the member 3. The lower or inner surface of the lens 9 is engaged with the cup flange 11 and the lens 9 and flange 11 are secured together and to the casing by being clamped by and between the upper or outer end of the casing member 3 and an inwardly-extending annular flange on the upper end of a collar 12 which is screwed onto the casing member 3. By removing the collar 12 access may be readily had to the lamp 8 for renewal and for other purposes.

The casing member 5 is provided with a transversely extending slot 13 in one side thereof, and located within the slot 13 and the hollow interior of the member 4 is a lens holder 14. The holder 14 carries a magnifying lens 15 of glass whose annular edge portion is seated in a groove 16 in the holder 14. The groove 16 is under-cut part way around the lens for the reception of a retaining spring 17 which is sprung into the groove to retain the lens in place. The removal and replacement of the spring 17 will permit the removal and replacement of the lens 15 for any desired purpose or purposes.

The lens holder 14 is pivoted to one side of the casing member 5 by means of a pin 18 which extends through the holder and member, and the holder 14 is adapted to be moved on the pin 18 from its normal position within the casing, as shown in Figs. 1, 4 and 6, to an outer position or operative position, as shown by dot-and-dash lines in Figs. 1 and 6.

The casing 2, lamp 8 and light directing lens 9 are in axial alinement, and the axis of the viewing lens 15 is arranged parallel to the axis of the casing, therefore, it will be understood that when the lens holder 14 is in the position shown by dot-and-dash lines in Figs. 1 and 6 and by full lines in Fig. 3, a physician using the device may point the lamp carrying end of the casing toward the part or parts of the patient to be examined and that the light rays from the lamp will be directed toward and concentrated upon the said part or parts and that the same may be easily and advantageously viewed by the physician through the magnifying lens 15.

The lens holder 14 rests normally within the casing not only for providing a compact normal relationship for the parts but also for the protection of the lens carried by the holder, and the holder 14 is provided with a nose 19 which projects outwardly from the casing member 5 when the lens holder is in the closed position therein, and by means of which the holder may be readily moved from within the casing to the open or operative position.

The lower casing member 4 contains a battery cell 20 or two axially alined cells in series for supplying electric current to the lamp 8. The cell 20 is longitudinally movable within the member 4 and it may be placed therein or removed therefrom through the other casing members 3 and 5 after first moving the lens holder 14 to the open position and removing the collar 12, lens 9, cup 10 and lamp 8 from the casing member 3.

The upper end of the battery cell 20 is provided with a contact terminal 21 which is adapted to make contact with the usual contact terminal 22 on the lower end of the lamp 8. The lower end of the battery cell 20 is engaged by a spring 23 which acts between the cell and a partition wall 24 fixed in the casing member 4 to urge the cell 20 toward the lamp 8 to make contact of its terminal 21 with the terminal 22 of the lamp. The opposite terminals of the cell 20 and lamp 8 are electrically connected through the spring 23 casing members 3, 4 and 5 and cup 10.

When the lens holder 14 is in the closed position, the lens 15 extends between the battery and lamp terminals 21 and 22, respectively, and separates and electrically insulates them; and, when the holder 14 is moved to the open position, it and its lens 15 are moved from between the lamp 8 and battery 20, and the spring 23 then raises the battery and moves its terminal 21 into contact with the lamp terminal 22.

The top surface of the lens holder 14, in all positions thereof, is in the plane of the bottom surface of the lamp terminal 22, and that portion 25 of the holder 14 which moves beneath the lamp terminal 22, when the holder is moved into and from within the casing, is beveled downwardly and is made wedge-shaped, as shown in Fig. 7, and the bottom of the wedge-shaped portion 25 forms, in effect, a continuation of the lower convex surface of the lens 15 so that when the holder 14 is moved into the casing the wedge-shaped portion 25 thereof and the convex surface of the lens 15 will enter between the battery and lamp terminals 21 and 22, respectively, and move the battery down against the action of the spring 23 to separate the terminals and break the electrical connection between them, and thereby act as a cut out for the electric current.

The casing member 5 has a hole extending therethrough within which a square bar 26 is fitted to slide longitudinally. The bar 26 extends parallel to the axis of the casing 2 and it is constructed to be held in different position of longitudinal adjustment within the hole in the casing member 5 by an eccentric 27 fitted to turn on a pivot pin 28 in the member 5. The eccentric 27 is located within a slot in the member 5 and it is provided with an arm 29 which extends therefrom, as shown in Fig. 2, and by means of which the eccentric may be turned to lock or unlock the bar in its position of adjustment.

The bar 26 rests normally in a position extending parallel to the casing 2 in close relation to one side thereof, as shown by full lines in Fig. 1, and it is adapted to be adjusted to a position to support a diagnostic instrument, such as a tongue depressor or an ear speculum, forwardly of the light directing lens 9 and in the region of the light rays projected by the lamp 8.

In the construction of the device herein illustrated, I have shown a tongue depressor 30 formed integral with one end of the bar 26, and, when it is desired to use the depressor 30, the bar 26 is removed from its position within the hole in the casing member 5, its ends are reversed and it is reinserted into the hole and locked therein in the desired adjusted position as shown by dot-and-dash lines in Fig. 1. In this position of the depressor 30 it may be readily utilized to depress the tongue of a patient, as the device is adjusted to direct light rays into his mouth and throat, to permit them to be seen clearly through the magnifying lens 15 during an examination thereof.

In Fig. 3 I have shown the bar 26 adjusted to extend beyond the end of the casing carrying the lamp 8 and I have shown the bar carrying a hollow ear speculum 31 and supporting the same in the proper relation to the lamp 8 and the viewing lens 15 to permit light to be directed from the lamp 8 and into the ear through the speculum 31, and to permit the interior of the ear to be viewed through the magnifying lens 15. The ear speculum has a bracket 32 secured to one side thereof and provided with diverging spring arms 33 having holes therein through which the bar 26 extends. The speculum 31 is held in place on the bar 26 by the engagement of the walls of the holes in the arms 33 with the bar 26 as the arms 33 tend to spring apart. When it is desired to apply the speculum 31 to the bar 26 or remove it therefrom or adjust it longitudinally thereon, the same may be readily done after the arms 33 are sprung toward each other to free them from their binding engagement with the rod 26.

To provide for nasal examinations I provide a nasal speculum, as shown in Figs. 9 and 10, comprising a partially cylindrical spring 36 having end portions which terminate in nostril spreading arms 37 which may be sprung toward each other to permit them to be inserted into a nostril and thereafter released to permit the spring 36 to move them apart and thereby spread or open the nostril to permit rays of light from the lamp 8 to enter the same and to permit the interior thereof to be viewed by the physician through the lens 15.

When the ear speculum 31 and the nasal speculum 35 are not in use they are carried by and partially housed within the lower end portion of the casing member 4, as shown in Fig. 1. In applying these speculums to the casing member 4, the arms 37 of the nasal speculum 35 are first sprung toward each other and the spring portion 36 is inserted into the casing member 4 in the position shown in Fig. 1, by passing the parts of the arms 37 which connect them with the spring 36, through a slot 37 in the member 4 until the said parts enter the expanded inner end portion 38 of the slot, whereupon the arms 37 are released and the said parts are permitted to expand in the expanded portion 38 of the slot which thereafter holds the speculum in place. After the nasal speculum has been applied to the casing member 4, as above described, the ear speculum 31 is applied thereto by inserting the same into the member 4 and into the spring 35 of the nasal speculum and by passing the bracket 32 into the slot 37 and into the space between the free ends of the arms 37 of the nasal speculum until the flange on the lower end of the ear speculum engages the bottom of the member 4. While the ear speculum is being placed in the position shown in Fig. 1, the resiliency of the lower end portion of the member 4 permits it to expand sufficiently to permit a projection 39 on the interior thereof to enter a perforation 40 in the speculum 31 and hold it in place. The resiliency of the casing member 4 permits the easy springing of the parts thereof to free the projection 39 from the perforation 40 for the removal of the speculum from the casing.

I claim as my invention:

1. In a diagnositc device, a tubular casing, an electric lamp mounted in one end portion thereof, a light directing lens mounted in the same end portion of the casing outwardly of the lamp, said casing, lamp and lens being in axial alinement, a lens holder pivoted on the casing on an axis which parallels the axis of the casing, said holder being movable on said axis from a position within the casing to a position exteriorly thereof, and a viewing lens mounted in the holder with its axis substantially parallel to the axis of the light directing lens.

2. In a diagnostic device, a tubular casing having an electric lamp in one end portion thereof positioned to direct light rays axially from the casing, a lens holder movable transversely of the casing from a position within the same to a position exteriorly thereof, a lens mounted in the holder with its axis substantially parallel to the axis of the lamp and the casing, a diagnostic instrument, and means supported by the casing and adapted to support said instrument in the region of light rays projected by said lamp.

3. In a diagnostic device, a tubular casing having an electric lamp in one end portion thereof positioned to direct light rays axially from the casing, a lens holder movable transversely of the casing from a position within the same to a position exteriorly thereof, a lens mounted in the holder with its axis substantially parallel to the axis of the lamp and the casing, a bar at one side of the casing in parallel relation thereto and adapted to be adjusted longitudinally to extend beyond the casing, means for securing the bar to the casing in different positions of longitudinal adjustment, and a diagnostic instrument adapted to be supported by the bar in the region of light rays projected by said lamp.

4. In a diagnostic device, a tubular casing having an electric lamp in one end portion thereof positioned to direct light rays axially from the casing, a lens holder movable transversely of the casing from a position within the same to a position exteriorly of the casing and from the last named position to the first named position, a lens mounted in the holder with its axis substantially parallel to the axis of the lamp, a battery cell movable longitudinally within the casing and having a terminal adapted to make and break contact with a terminal of the lamp, a spring acting against the battery cell and urging the said terminal thereof toward the said terminal of the lamp, said holder being provided with means to move the battery cell away from the lamp against the action of the spring and thereby electrically separate said terminals when said holder is moved to the first named position, and said spring moving the said battery cell terminal into contact with the said lamp terminal when said holder is moved to the second named position.

5. In a diagnostic device, a tubular casing having an electric lamp in one end portion thereby positioned to direct light rays axially from the casing, a lens holder movable transversely of the casing from a position within the same to a position exteriorly of the casing and from the last named position to the first named position, a glass lens mounted in the holder with its axis substantially parallel to the axis of the lamp, a battery cell movable longitudinally within the casing and having a terminal adapted to make and break contact with a terminal of the lamp, a spring acting against the battery cell and urging the said terminal thereof toward the said terminal of the lamp, said holder being provided with means to move the battery cell away from the lamp against the action of the spring and thereby electrically separate said terminals when said holder is moved to the first named position, said spring moving the said battery cell terminal into contact with the said lamp terminal when said holder is moved to the second named position, and said lens occupying a position between said terminals and electrically separating them in the first named position of said holder.

6. In a diagnostic device, a tubular casing having an electric lamp in one end portion thereof positioned to direct light rays axially from the casing, a lens holder movable transversely of the casing from a position within the same to a position exteriorly of the casing and from the last named position to the first named position, a lens mounted in the holder with its axis substantially parallel to the axis of the lamp, a battery cell movable longitudinally within the casing and having a terminal adapted to make and break contact with a terminal of the lamp, a spring acting against the battery cell and urging the said terminal thereof toward the said terminal of the lamp, said holder being provided with a wedge-shaped part adapted to enter between said terminals and move the battery cell away from the lamp against the action of the spring and thereby electrically separate said terminals when said holder is moved to the first named position, and said spring moving the said battery cell terminal into contact with the said lamp terminal when said holder is moved to the second named position.

CHARLES H. WOLFF.